(12) United States Patent
Koontz

(10) Patent No.: US 8,734,064 B2
(45) Date of Patent: May 27, 2014

(54) CUTTING INSERT FOR A MACHINE TOOL

(75) Inventor: Raymond E. Koontz, Southington, CT (US)

(73) Assignee: Century Tool & Design, Inc., Milldale, CT (US)

(*) Notice: Subject to any disclaimer, the term of this patent is extended or adjusted under 35 U.S.C. 154(b) by 155 days.

(21) Appl. No.: 13/216,624

(22) Filed: Aug. 24, 2011

(65) Prior Publication Data

US 2013/0051943 A1 Feb. 28, 2013

(51) Int. Cl.
  *B23B 27/16* (2006.01)
  *B23P 15/28* (2006.01)

(52) U.S. Cl.
  USPC .............................. 407/113; 407/42; 407/103

(58) Field of Classification Search
  USPC ...................... 407/103, 113, 114, 35, 42, 99
  See application file for complete search history.

(56) References Cited

U.S. PATENT DOCUMENTS

| | | | |
|---|---|---|---|
| D307,859 S | | 5/1990 | Morrissey |
| 5,007,775 A | * | 4/1991 | Pantzar .......................... 407/113 |
| 5,474,407 A | * | 12/1995 | Rodel et al. .................... 408/227 |
| 5,505,569 A | * | 4/1996 | Gustafsson et al. ........... 407/113 |
| D396,865 S | | 8/1998 | Morrissey |
| 5,827,019 A | | 10/1998 | Morrissey |
| 6,341,924 B1 | * | 1/2002 | Tagtstrom ...................... 407/114 |
| 6,582,165 B1 | * | 6/2003 | Baba .............................. 408/233 |
| 7,052,214 B2 | * | 5/2006 | Janness ............................ 407/35 |
| D526,339 S | * | 8/2006 | Shanley ........................ D15/139 |
| 7,429,150 B2 | * | 9/2008 | Kovac .............................. 407/66 |
| D584,752 S | * | 1/2009 | Jonsson et al. ............... D15/139 |
| 7,540,696 B1 | | 6/2009 | Houle |
| D605,209 S | * | 12/2009 | Jonsson et al. ............... D15/139 |
| 7,862,261 B2 | | 1/2011 | Bean |

* cited by examiner

*Primary Examiner* — Will Fridie, Jr.
(74) *Attorney, Agent, or Firm* — Alix, Yale & Ristas, LLP

(57) ABSTRACT

A tooling insert for a screw machine includes a plurality of cutoff blades. The insert is indexable. The cutting side of the blade includes a planar impact surface with a 7° side rake angle. In addition, the blade cutting side has a narrow raised land adjacent the impact surface.

20 Claims, 5 Drawing Sheets

CUTTING INSERT FOR A MACHINE TOOL

BACKGROUND

This disclosure relates generally to replaceable cutting inserts which are employed in machine tooling such as for screw machines. More particularly, this disclosure relates to indexable cutting inserts.

Screw machine tools typically employ replaceable carbide steel inserts for cutting and cutoff operations. It is common that the screw machine tooling be configured to accept inserts with multiple cutting blades. As the blades are used, the inserts are indexed to present a new cutting blade for usage so as to reduce recalibration, setup and downtime for the machine.

Numerous screw machine tools are configured to accept inserts with four angularly spaced blades. The inserts are sequentially indexable about a central axis to present a new cutting blade. During usage, small chips may be retained on the working surfaces of the blades and, over time cause the cutting surfaces to wear.

SUMMARY

Briefly stated, an indexable insert for a cutting tool comprises a support body. The support body has a central opening. Cutters integrally extend from the body and are equiangularly located about a central axis through an opening in the body. Each cutter has a planar impact cutting surface and an adjacent land. Each of the impact cutting surfaces defines a side rake angle which ranges from approximately 6° to approximately approximately 10° relative to a plane parallel to the central axis. The side rake angle is preferably substantially 7°. In one embodiment, there are four cutters. The land preferably has a tapered configuration.

In one preferred embodiment, the impact cutting surface has a side rake angle of substantially 7° relative to a reference pane parallel to the central axis and a top rake angle of substantially 8° relative to the reference plane. A raised land is disposed adjacent each of the planar impact cutting surfaces. The cutter has a generally triangular shape. There are preferably four such cutters and the insert is a one-piece member manufactured from carbide steel.

A replaceable cutter for a tool comprises a support body. At least one cutter blade integrally extends from the body. Each cutter blade has a working surface principally comprising a planar impact cutting surface. The planar impact cutting surface defines a side rake angle which ranges from 6° to 10° relative to a reference plane parallel to a transverse axis perpendicular to the support body. The planar impact cutting surface has a top rake angle which ranges from 5° to 12° relative to the plane. A raised land is adjacent the impact cutting surface. The land is preferably tapered, and the side rake angle is preferably substantially 7°.

DETAILED DESCRIPTION

With reference to the drawings wherein like numerals represents like parts throughout the figures, a cutting insert for screw machine tooling is generally designated by the numeral 10. Screw machine insert 10 is an indexable insert adapted for usage in a screw machine for the sequential cutoff of workpiece materials.

Figure 1:
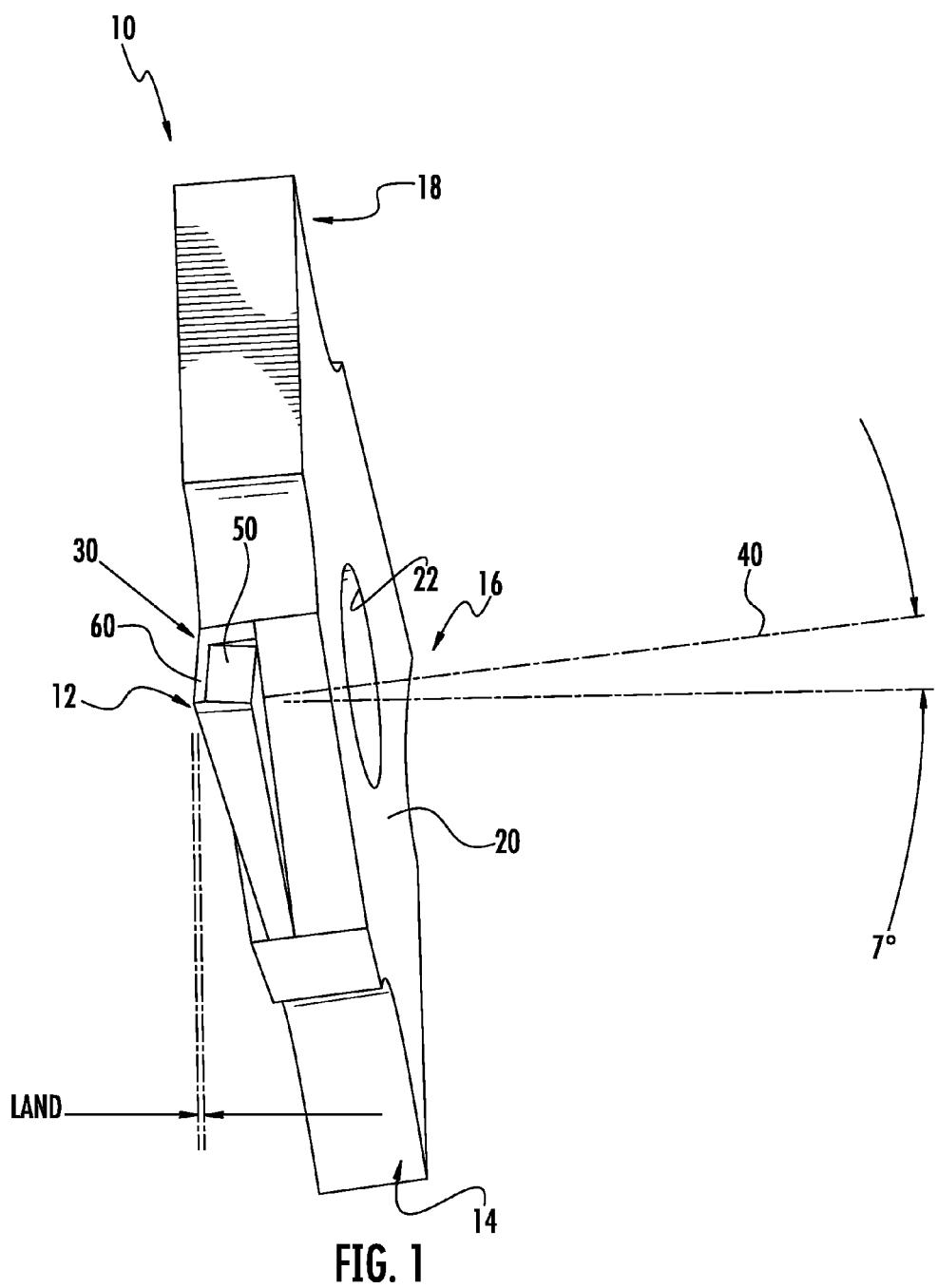
FIG. 1 is a perspective view, partly in diagram form, of an indexable insert for a screw machine.
Figure 2:
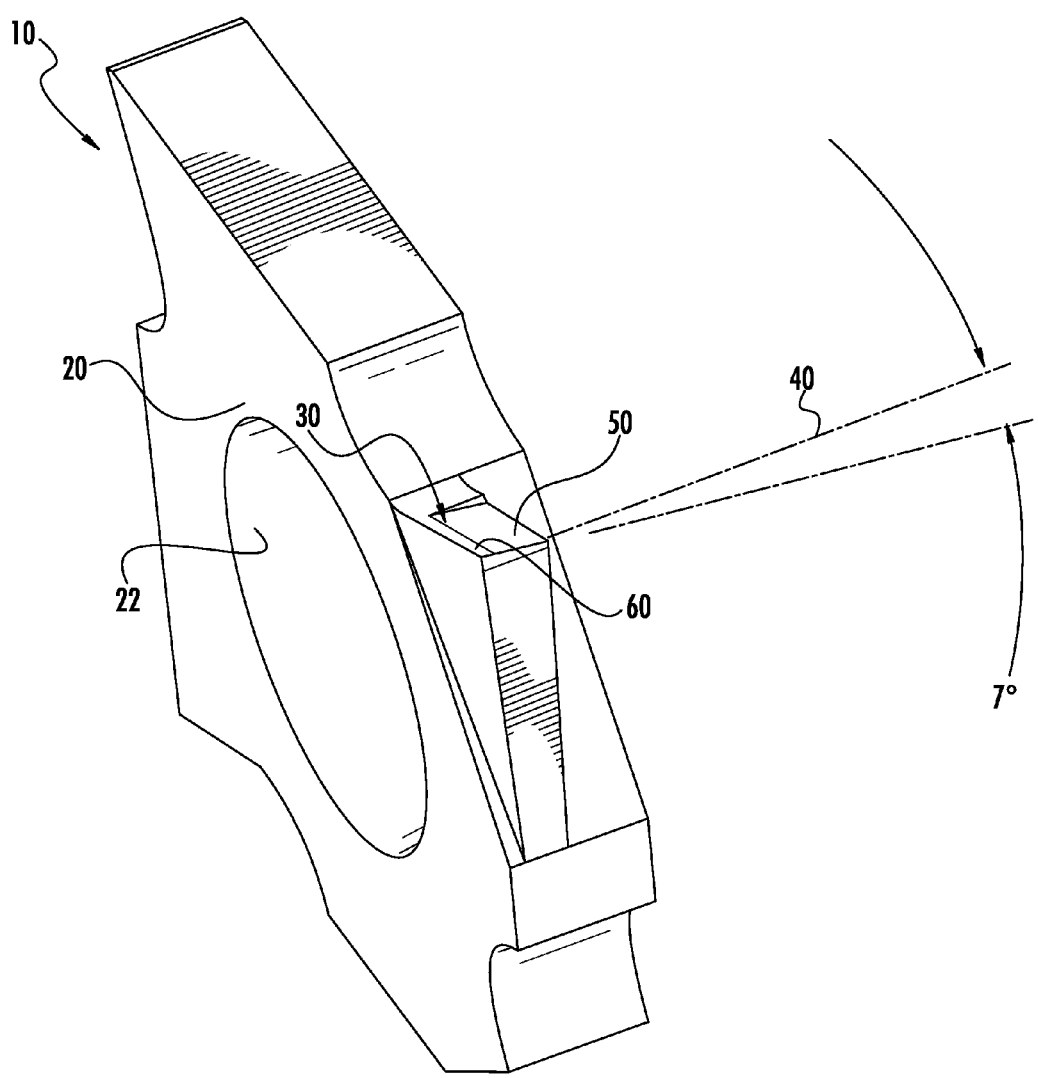
FIG. 2 is a perspective view, partly in diagram form, of the indexable insert of FIG. 1 taken from a different perspective.
Figure 3:
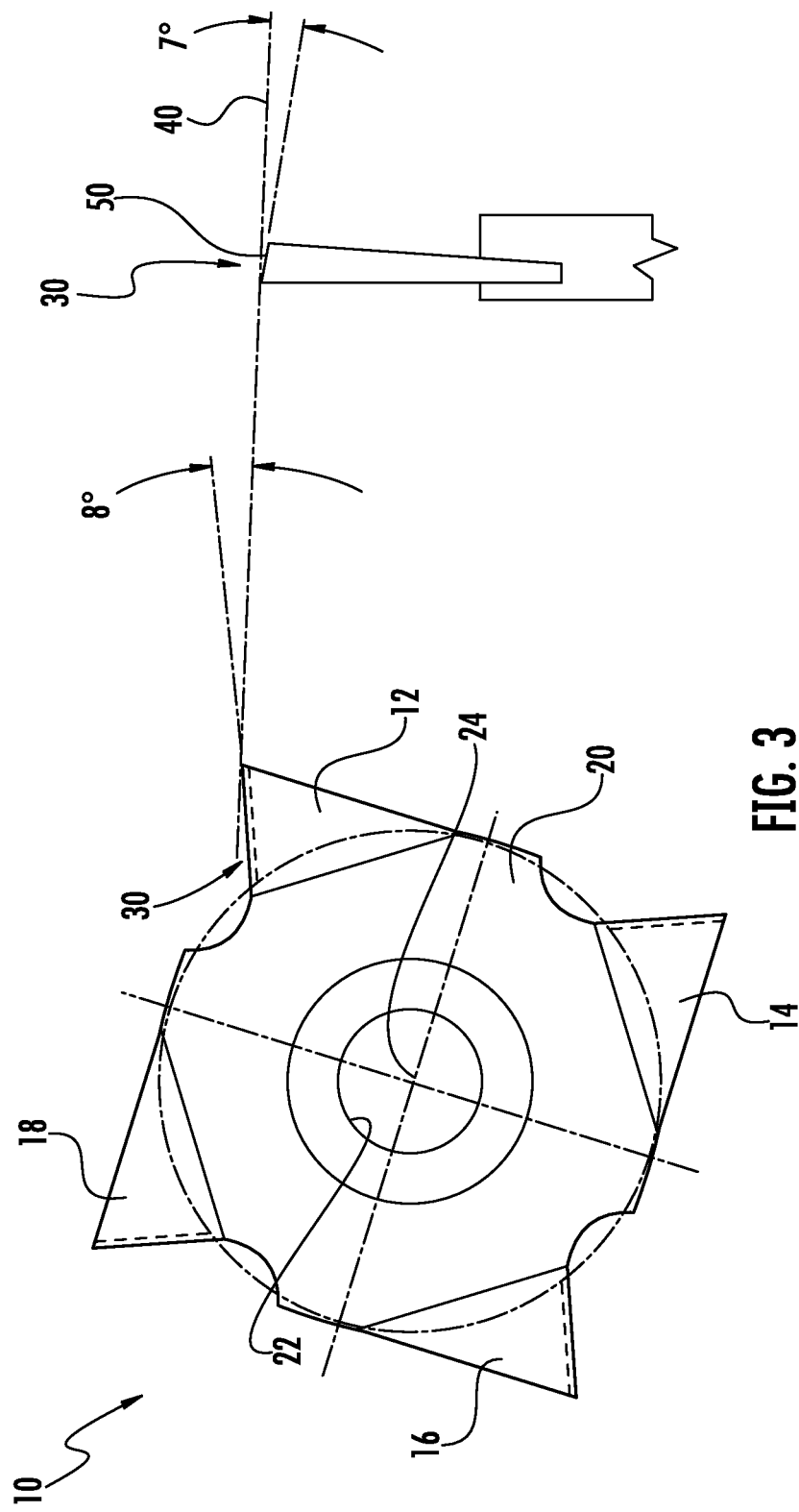
FIG. 3 is a side schematic view, partly in diagram form and partly in phantom, illustrating the relationship between the various portions of a cutting blade for the indexable insert of FIG. 1.

With reference to FIG. 3, the insert 10 comprises four angularly spaced blades 12, 14, 16 and 18 which are identical and project outwardly from a central base 20 to form a generally triangular profile. The base 20 includes a central opening 22 for rotatably mounting the insert in the screw machine. The central opening defines a central transversely extending axis 24. The insert 10 is a one-piece member preferably formed from carbide steel and has a tin or tin/aluminum/nickel coating.

With reference to FIGS. 1-4, the representative blade 12 includes a multifaceted working surface 30 generally designated for convenience of description as the top surface. Substantial portions of the working surface are canted or oriented in relation to a reference plane 40 parallel to a central transverse axis 24 (perpendicular to the plane of the FIG. 3 drawing) through the opening 22. The working surface 30 comprises a planar impact cutting surface 50 and an adjacent land 60. The planar impact surface 50 constitutes the principal surface structure of the working surface 30 and is precisely oriented and precision ground. With additional reference to FIG. 3, the planar impact surface 50 preferably has a top rake angle of substantially 8° relative to reference plane 40. The top rake angle may range from approximately 5° to 12°. The impact surface 50 also has a side rake angle disposed at an acute to the reference plane 40 ranging between approximately 6° and 10° and preferably substantially 7°.

Figure 4:
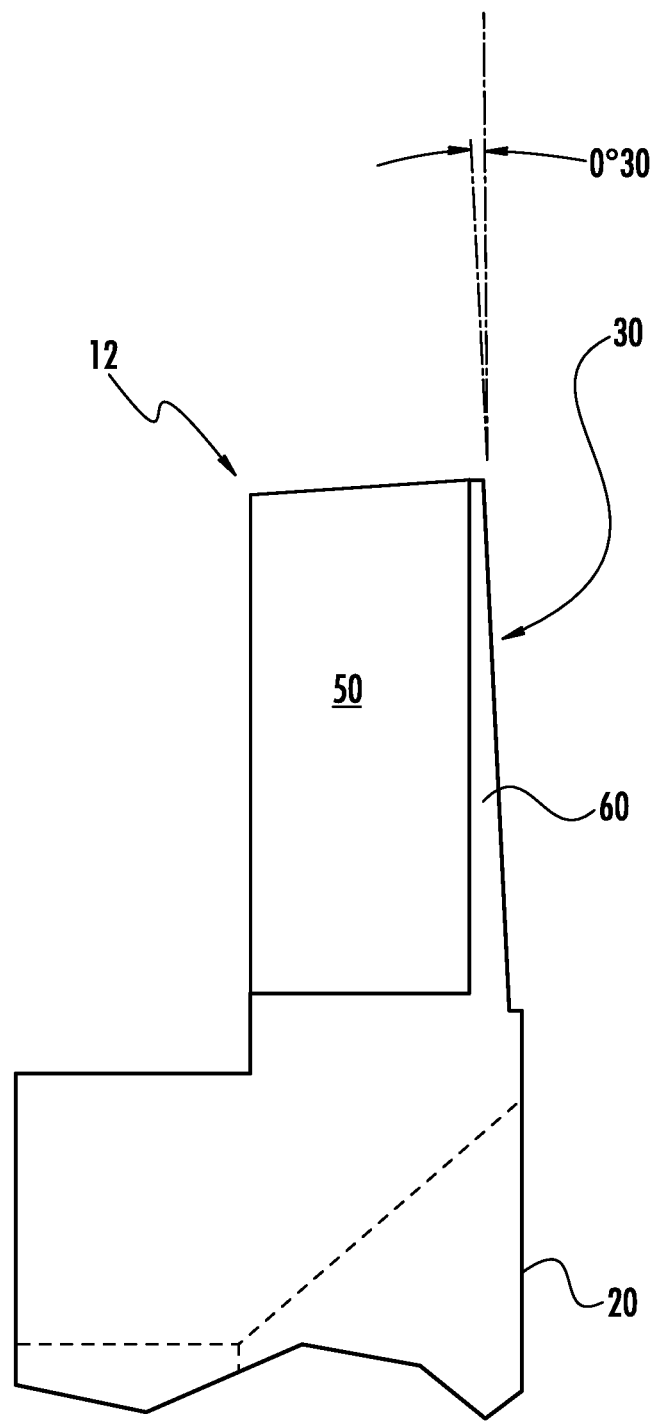
FIG. 4 is an exploded fragmentary top view, partly in diagram form, of the cutting blade of FIGS. 3.
Figure 5:
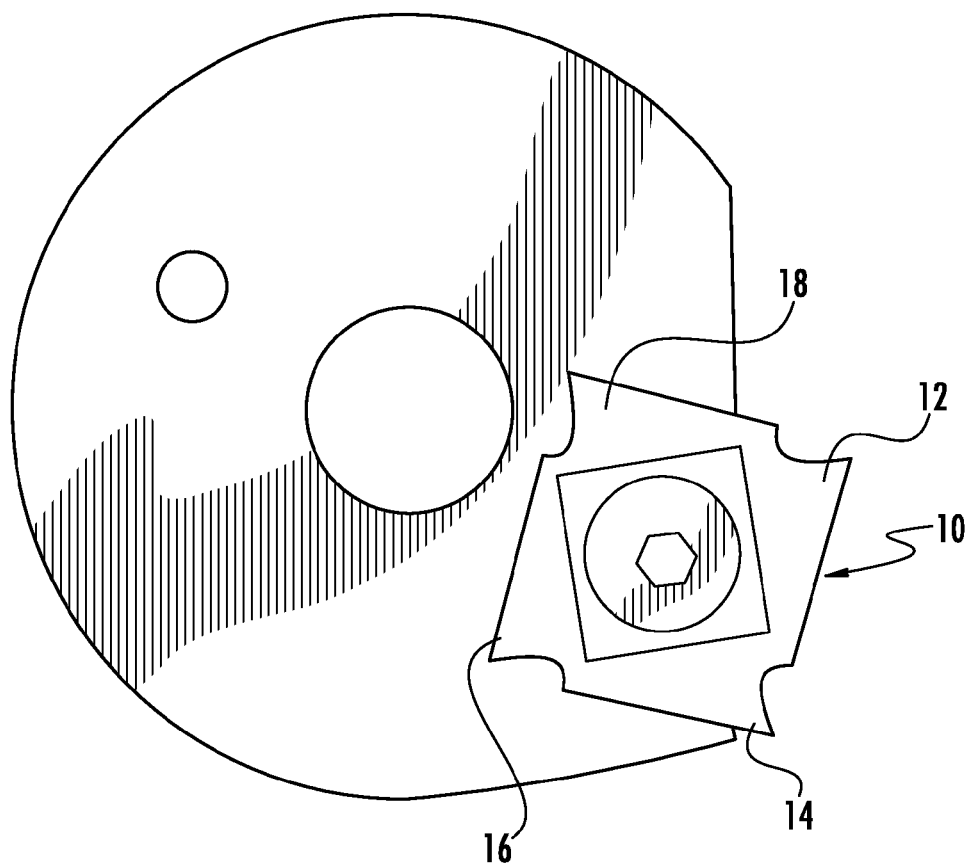
FIG. 5 illustrates an indexable insert as mounted for installation in a representative cutter tooling of a screw machine.

With reference to FIG. 4, the blade working surface 30 also includes a raised land 60 which tapers from proximate the inboard portion (closest to the axis 24) to the extreme vertex portion. In one embodiment, the protracting blade dimension is approximately 0.30 inches and the land extends approximately 0.25 inches.

The acute side rake angle and particularly the substantially 7° side rake angle tends to force and/or deflect chips to the side of the cutting surface and thus reduce the wear of the cutting surface as compared to cutters without the small side rake angle. It will be appreciated that the impact cutting surface 50 with the small acute side rake angle together with the small acute top rake angle provide a cutting surface which is highly reproducible and also has an extended useful life.

Substantially identical equiangularly located cutting blades 12, 14, 16, and 18 are provided on the insert, as illustrated in the drawings.

It will be appreciated that an impact surface with a substantially 7° side rake angle or a side rake angle in the range of 6° to 10° can be employed on a wide range of machine cutting inserts. If the side rake angle is too large, the impact surface will not provide the proper cutting function. If the side rake angle is too small, the impact surface will not tend to deflect the small metallic chips/particulates to the side during the continuous sequential cutting operation.

The invention claimed is:

1. An indexable insert for a cutting tool comprising:
   a support body defining a central opening defining a central transverse axis, said support body having first and second surfaces perpendicular to said central axis;

a plurality of cutters integrally extending from said body and being equiangularly located about said axis;

each said cutter having an impact cutting surface extending between first and second planar side surfaces and terminating in a cutting edge supported at a radially outer extremity, said first side surface being in a plane including a line parallel with one of said first and second support body surfaces and said second side surface containing no line parallel with said first side surface, said impact cutting surface and said second side surface meeting at a linear burnishing edge extending from a first end adjacent said support body to a second end intersecting said cutting edge; and each said impact cutting surface defining a side rake angle which ranges from substantially 6° to 10° relative to a plane parallel to said central transverse axis, wherein said impact cutting surface has a first width between said first and second side surfaces adjacent said support body and a second width at said cutting edge, said second width being less than said first width.

2. The indexable insert of claim 1 wherein said side rake angle is substantially 7°.

3. The indexable insert of claim 1 wherein there are four cutters.

4. The indexable insert of claim 1 wherein said impact cutting surface includes a land along said burnishing edge and said land has a tapered configuration, being narrower at said cutting edge than at said support body.

5. The indexable insert of claim 1 wherein said impact cutting surface has a top rake angle which ranges from 5° to 12° relative to said plane.

6. An insert for a cutting tool comprising:
a support body defining a central opening defining a central axis;
a plurality of cutters integrally extending from said body and being equiangularly located about said axis;
each said cutter comprising a working surface, first and second side surfaces and supporting a cutting edge at a radial outer extremity, said working surface having a planar impact cutting surface intersecting said cutting edge; and
each said impact cutting surface having a side rake angle of substantially 7° relative to a reference plane parallel to said central axis and a top rake angle of substantially 8° relative to said reference plane, resulting in a cutting edge that is canted with respect to said axis.

7. The insert of claim 6 further comprising a raised land adjacent each said planar impact cutting surface.

8. The insert of claim 7 wherein said land is tapered.

9. The insert of claim 6 wherein each said cutter has a generally triangular shape.

10. The insert of claim 6 wherein there are four cutters.

11. The insert of claim 6 wherein said insert is a one-piece member manufactured from carbide or steel.

12. A replaceable cutter for a tool comprising:
a support body defining a transverse axis;
at least one cutter integrally extending from said body;
each said cutter having a working surface principally comprising a planar impact cutting surface terminating at a cutting edge at a radial outer extremity, each said cutter including a first cutter side surface connecting said working surface to said support body and defining a burnishing edge at a junction of said working surface and said first cutter side surface, said burnishing edge defining an acute angle with a second cutter side surface so that said working surface narrows as it progresses away from said support body to said cutting edge; and
said planar impact cutting surface defining a side rake angle which ranges from 6° to 10° relative to a plane parallel to said central axis and said cutting edge is not parallel with said axis.

13. The replaceable cutter of claim 12 wherein said side rake angle is substantially 7° relative to a plane parallel to said transverse axis.

14. The replaceable cutter of claim 13 wherein said planar impact cutting surface has a top rake angle which ranges from 5° to 12° with respect to said plane.

15. The replaceable cutter of claim 13 wherein said planar impact cutting surface has a top rake angle of substantially 8° relative to said plane.

16. The replaceable cutter of claim 12 and further comprising a raised land between said impact cutting surface and said burnishing edge.

17. The replaceable cutter of claim 16 wherein said land is tapered.

18. The indexable insert of claim 1, wherein each said cutter includes a flank surface between said first and second side surfaces and extending from said cutting edge to said support body, said flank surface having a first flank surface width between said first and second side surfaces at said cutting edge and a second flank surface width at said support body, said first flank surface width being greater than said second flank surface width.

19. The indexable insert of claim 1, wherein said burnishing edge and said cutting edge meet at an acute angle.

20. The replaceable cutter of claim 12, wherein said cutter includes a flank surface behind said cutting edge in a cutting direction, said working surface has a width between first and second cutter side surfaces and extends from said support body to said cutting edge, said first and second cutter side surfaces being arranged to provide relief behind and to at least one side of said working surface in a cutting direction.

* * * * *